(12) United States Patent
Ahlquist

(10) Patent No.: US 7,945,790 B2
(45) Date of Patent: May 17, 2011

(54) LOW-COST PSEUDO-RANDOM NONCE VALUE GENERATION SYSTEM AND METHOD

(75) Inventor: Brent M. Ahlquist, Loomis, CA (US)

(73) Assignee: Intel Corporation, Santa Clara, CA (US)

( * ) Notice: Subject to any disclaimer, the term of this patent is extended or adjusted under 35 U.S.C. 154(b) by 947 days.

(21) Appl. No.: 11/633,952

(22) Filed: Dec. 4, 2006

(65) Prior Publication Data

US 2008/0130875 A1 Jun. 5, 2008

(51) Int. Cl.
*H04L 9/32* (2006.01)
*H04L 9/00* (2006.01)
*G06F 11/30* (2006.01)

(52) U.S. Cl. ........ 713/193; 713/189; 713/190; 713/191; 713/192; 726/27; 726/28; 726/29; 726/30

(58) Field of Classification Search .................... 713/193
See application file for complete search history.

(56) References Cited

U.S. PATENT DOCUMENTS

| | | | |
|---|---|---|---|
| 6,836,853 | B1 | 12/2004 | Dover et al. |
| 6,931,132 | B2 * | 8/2005 | Billhartz et al. ............. 380/280 |
| 2007/0005955 | A1 * | 1/2007 | Pyle et al. ..................... 713/156 |
| 2007/0067375 | A1 * | 3/2007 | Inaoka et al. ................. 708/250 |

OTHER PUBLICATIONS

Hasbun et al—U.S. Appl. No. 11/300,103 filed Dec. 13, 2005—Methods and Apparatus for Providing a Secure Channel Associated With a Flash Device.

* cited by examiner

*Primary Examiner* — Longbit Chai
(74) *Attorney, Agent, or Firm* — Trop, Pruner & Hu, P.C.

(57) ABSTRACT

Briefly, a low-cost system and method for pseudo-random nonce value generation is disclosed.

20 Claims, 3 Drawing Sheets

LOW-COST PSEUDO-RANDOM NONCE VALUE GENERATION SYSTEM AND METHOD

BACKGROUND

Description of the Related Art

The present disclosure relates generally to flash memory systems, and more particularly, to methods and apparatus for providing secure access to a flash device.

Typically, a flash memory may be well suited for wireless electronic devices such as cellular telephones because a flash memory may retain digital information without power. In particular, a flash memory (e.g., a flash random access memory (RAM)) is a non-volatile memory that may be erased or written in units of blocks. Instead of erasing or writing at a byte level such as an electrically erasable programmable read-only memory (EEPROM), a flash memory may update or change stored data faster by erasing or writing in block sizes.

It is desirable to proved secure access to flash devices. Encryption is a common security measure used for communications between devices. However, the use of encryption does not protect against replay attacks where a communication is captured and replayed. Techniques are sought that provide protection against replay attacks while remaining cost effective.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

Figure 1:
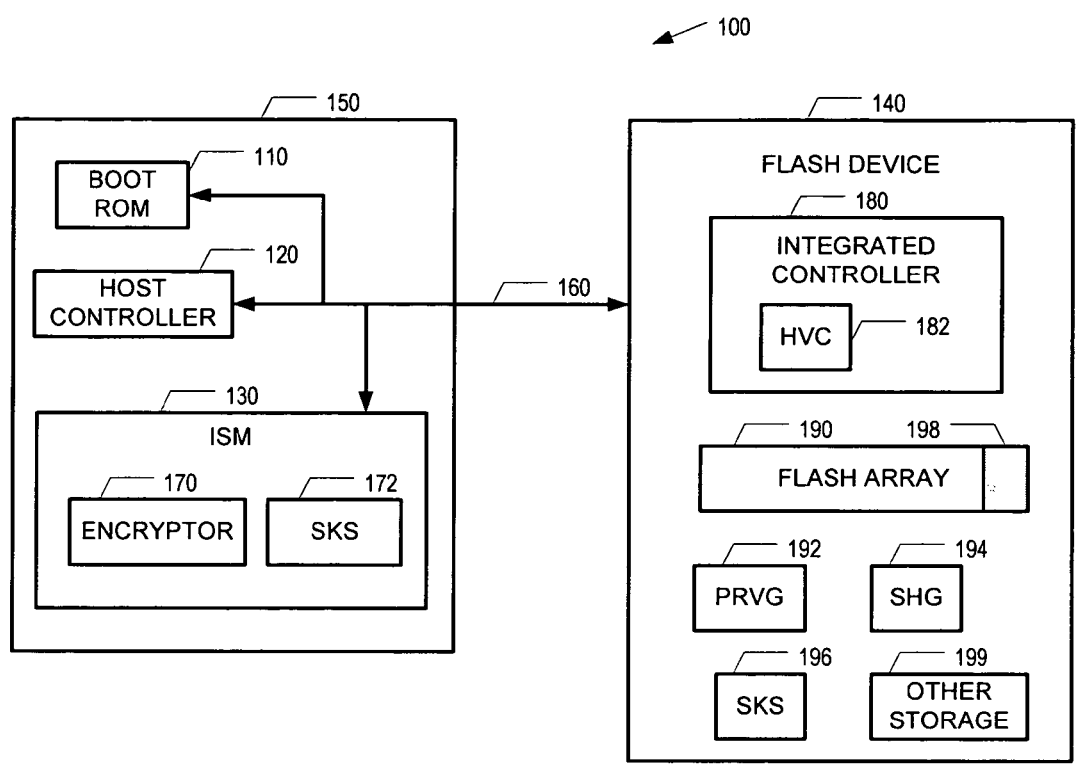
FIG. 1 illustrates a flash memory system according to an embodiment of the present invention.

Referring to FIG. 1, an example flash memory system 100 may include a boot read-only memory (ROM) 110, a host controller 120, an integrated security module (ISM) 130, and a flash device 140. In general, the flash memory system 100 may be implemented in an electronic device (not shown). For example, the flash memory system 100 may be implemented in a desktop computer, a network server, a laptop computer, a handheld computer, a tablet computer, a cellular telephone (e.g., a smart phone), a pager, an audio and/or video player (e.g., an MP3 player or a DVD player), a gaming device, a digital camera, a navigation device (e.g., a global position system (GPS) device), a medical device (e.g., a heart rate monitor, a blood pressure monitor, etc.), and/or other suitable relatively stationary, mobile, and/or portable electronic devices.

While the boot ROM 110, the host controller 120, and the integrated security module 130 are depicted as separate blocks, these components may be integrated within a central processing unit (CPU) 150. The CPU 150 may be operatively coupled to the flash device 140 via a flash interface 160. For example, the flash interface 160 may include a bus, and/or a direct link between the boot ROM 110, the host controller 120, the integrated security module 130, and the flash device 140.

In general, the boot ROM 110 may provide boot code to the flash device 140 for initializing a secure channel between the integrated security module 130 and the flash device 140. To protect against threats such as viruses, worms, or bad code, for example, the integrated security module 130 and the flash device 140 may use the secure channel to authenticate an operation (e.g., a command from the integrated security module 130). For example, the operation may be a read operation, a write operation, a patch operation, a key operation, and/or other suitable operations. As described in detail below, the secure channel may operate in accordance with a hash-based authentication algorithm instead of an asymmetric authentication algorithm (e.g., public key encryption developed by Rivest, Shamir, and Adleman (RSA)) to increase performance of the flash memory system 100.

The host controller 120 (e.g., an application processor) may perform a variety of operations for the CPU 150. For example, the host controller 120 may process operations ranging from running an operating system (OS) or an application to invoking the boot ROM 110 as mentioned above.

The integrated security module 130 may include an encryptor 170 and a secure key storage (SKS) 172. In general, the integrated security module 130 may be a dedicated module to process security operations. For example, the host controller 120 may offload security operations to the integrated security module 130 so that the host controller 120 may be available for other processing associated with the flash memory system. As described in detail below, the encryptor 170 may encrypt or wrap accesses to flash device 140 with a cryptographic key generated and provided by the flash device 140. The secure key storage 172 may locally store the encrypted key from the encryptor 170 at the integrated security module 130.

The flash device 140 may include an integrated controller 180, a flash array 190, a pseudo-random value generator (PRVG) 192, a secure hash generator (SHG) 194, a secure key storage (SKS) 196, a journal 198 and other storage 199. A journal 198 is a reserved portion of flash array 190, used for the generation of pseudo-random nonce values. Other storage 199 may contain a journal modified status bit and an old nonce value. Other storage 199 may be volatile storage, may be a portion of SKS 196, or may be a portion of flash array 190—embodiments of the invention are not limited in this respect. In general, the flash device 140 may internally authenticate operations to protect itself against malicious and/or inadvertent modifications. Prior to performing a requested operation such as read, write, patch, key, and/or other suitable operations, the flash device 140 may authenticate the requested operation internally. If the requested operation is authentic, the flash device 140 may perform the operation. Otherwise if the requested operation is not authentic, the flash device 140 may disregard the request.

The integrated controller 180 may initialize a secure channel between the integrated security module 130 and the flash device 140, and process a command request from the integrated security module 130 in response to receipt of the command request via the secure channel. Briefly, the integrated controller 180 may also include a hash value comparator (HVC) 182 to compare hash values generated by the integrated security module 130 and the flash device 140. The flash array 190 may store data, code, and/or other suitable information. The pseudo-random value generator 192 may generate a nonce value, which may be provided to the integrated security module 130 to generate the encrypted key. A nonce value is a value that varies over time that is non-predictable such that it can be used, with encryption and/or hashing, to limit or prevent unauthorized replay or reproduction of a communication. The secure hash generator 194 may generate the cryptographic key, which may also be provided to the integrated security module 130 to generate the encrypted key. The secure key storage 196 may locally store the cryptographic key at the flash device 140. The secure key storage 196 may also store the encrypted key from the integrated security module 130. The methods and apparatus described herein are not limited in this regard.

While the components shown in FIG. 1 are depicted as separate blocks within the flash device 140, the functions performed by some of these blocks may be integrated within a single semiconductor circuit or may be implemented using two or more separate integrated circuits. For example, although the pseudo-random value generator 192 and the secure hash generator 194 are depicted as separate blocks within the flash device 140, the pseudo-random value generator 192 and the secure hash generator 194 may be integrated into a single component. The methods and apparatus described herein are not limited in this regard.

Figure 2:
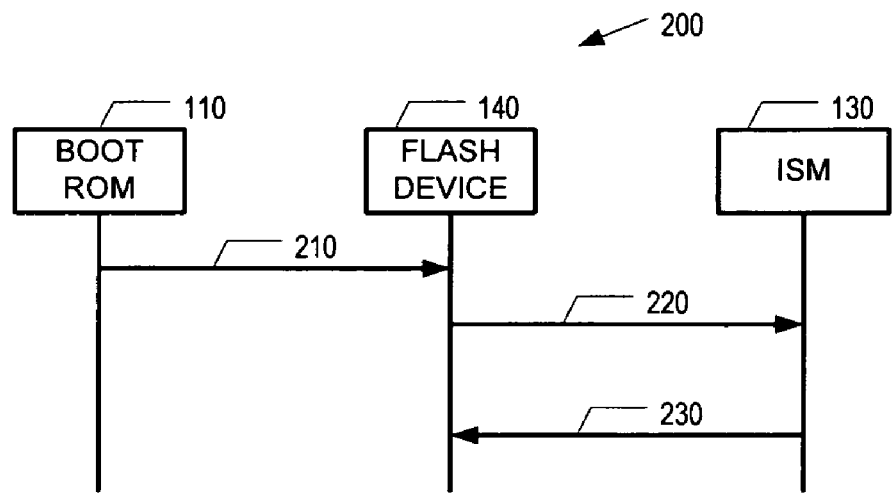
FIG. 2 illustrates secure channel initialization according to an embodiment of the present invention.

To protect against threats/attacks (e.g., viruses, worms, or bad code) and/or to increase performance, the flash memory system 100 may include a secure channel between the integrated security module 130 and the flash device 140. In the example of FIG. 2, a secure channel initialization system 200 may begin with the boot ROM 110 providing the flash device 140 with a command to generate a cryptographic key (210). In one example, the flash device 140 (e.g., via the pseudo-random value generator 192 and/or the secure hash generator 194) may generate a keyed-hash message authentication code (HMAC) key. The flash device 140 (e.g., via the integrated controller 160) may store the HMAC key in the secure key storage 196. The flash device 140 may provide the HMAC key to the integrated security module 130 (220).

The integrated security module 130 (e.g., via the encryptor 170) may encrypt or wrap the HMAC key (e.g., a wrapped HMAC key). For example, the encryptor 170 may operate in accordance with encryption standards developed by the National Institute of Standards and Technology (NIST) such as Advanced Encryption Standard (AES) (published Nov. 26, 2001), Data Encryption Standard (DES) (published Jan. 15, 1977), variations and/or evolutions of these standards, and/or other suitable encryption standards, algorithms, or technologies. Accordingly, the integrated security module 130 may store the wrapped HMAC key in the secure key storage 172 and also in the secure key storage 196 of the flash device 140. In one example, the integrated security module 130 may use write operations to store the wrapped HMAC key in the flash device 140 (230). External devices relative to the flash memory system 100 and/or other components of the flash memory system 100 (e.g., the host controller 120) do not have or know the wrapped HMAC key shared between the integrated security module 130 and the flash device 140. As a result, the secure channel between the integrated security module 130 and the flash device 140 may be used to protect against malicious or inadvertent modifications. The methods and apparatus described herein are not limited in this regard.

Figure 3:
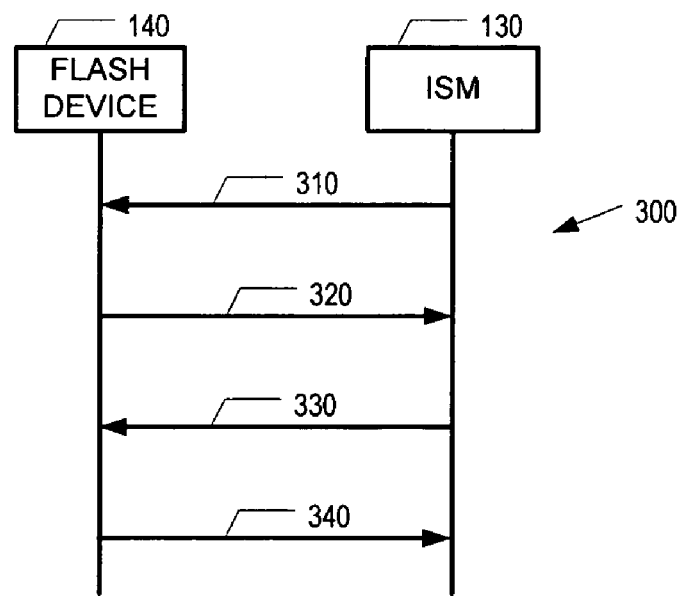
FIG. 3 illustrates secure channel operations according to an embodiment of the present invention.

With a secure channel initialized as described in connection with FIG. 2, for example, a secure channel operation system (e.g., the secure channel operation system 300) may process a command request from the integrated security module 130. Turning to FIG. 3, for example, the secure channel operation system 300 may begin with the integrated security module 130 generating a command request to the flash device 140. The command request may be associated with a command or an operation such as, for example, write, read, patch, and/or other suitable operations. Accordingly, the integrated security module 130 may provide the command request to the flash device 140 (310).

In response to receipt of the command request from the integrated security module 130, the flash device 140 (e.g., via the pseudo-random value generator 192) may generate a nonce value. For example, the nonce value may be a pseudo-random number to protect against replay attacks in which valid data transmission is maliciously or fraudulently replayed or delayed. Nonce generation is described in more detail below with respect to FIG. 4. The flash device 140 may provide the integrated security module 130 with the nonce value (320).

Based on the wrapped HMAC key as described in connection with the secure channel initialization system 200 of FIG. 2, the integrated security module 130 may generate a first hash value associated with the command. Accordingly, the integrated security module 130 may provide the flash device 140 with the command, the first hash value, and the nonce value (330).

To determine whether the command is from the integrated security module 130, the flash device 140 (e.g., via the integrated controller 180 and/or the secure hash generator 194) may generate a second hash value associated with the command based on the wrapped HMAC key generated by the secure channel initialization system 200 of FIG. 2. As noted above, the integrated security module 130 may provide the wrapped HMAC key, and the flash device 140 may store the wrapped HMAC key in the secure key storage 196.

According to an alternate embodiment of the present invention, rather than providing the HMAC key to flash device 140, the HMAC key may be installed into flash device 140 during the manufacturing process. The invention is not limited in this respect.

To identify a condition indicative of authenticity associated with the command from the integrated security module 130, the flash device 140 (e.g., via the hash value comparator 182 of the integrated controller 180) may compare the second hash value with the first hash value from the integrated security module 130. If the first and second hash values are identical, the flash device 140 may determine that the command is from the integrated security module 130 (e.g., the command is authentic). Accordingly, the flash device 140 may perform the command of the command request from the integrated security module 130. Otherwise if the first and second hash values are not identical, the flash device 140 may not perform the command of the command request.

The flash device 140 may generate and provide a response to the integrated security module 130 (340). The response may indicate the status of the command request. Based on the response, the integrated security module 130 may determine whether the flash device 140 performed the command of the command request or rejected the command request.

Although the above examples are described with respect to a HMAC key, the methods and apparatus described herein may use other suitable cryptographic keys, message authentication codes, and/or digital signatures. Further, although a particular order of actions is illustrated in FIGS. 2 and 3, these actions may be performed in other temporal sequences. For example, the actions illustrated in FIGS. 2 and/or 3 may be executed repetitive, serial, and/or parallel manners. The methods and apparatus described herein are not limited in this regard.

According to an embodiment of the present invention, secure accesses to flash device 140 utilize a pseudo-random nonce value generated by the pseudo-random value generator 192. Upon system power up, the first generated pseudo-random nonce value is obtained from journal 198 of the flash array 190. Subsequent generated pseudo-random nonce values are generated using the previously used nonce value. Thus, for systems with limited "on/off" cycles, a set of private values may be stored in the journal 198 to provide adequate initial pseudo-random nonce values. For example, a cell phone has a typical life cycle of three years. Assuming a user turned the cell phone on/off once per day, a journal with 1000 entries would be sufficient to provide enough pseudo-random nonce values for the life cycle of the cell phone.

With non-volatile memory write operations employing symmetric (HMAC) authentication, a nonce value generated in the device is essential for preventing replay attacks. Complexity and cost can be saved by creating a nonce generation scheme that utilizes the device's required authentication facilities and resident non-volatile memory capabilities based on knowledge of expected number of lifetime power cycles. Without knowledge of limited power cycles, adding expensive hardware components such as a random number generator would be necessary.

Figure 4:
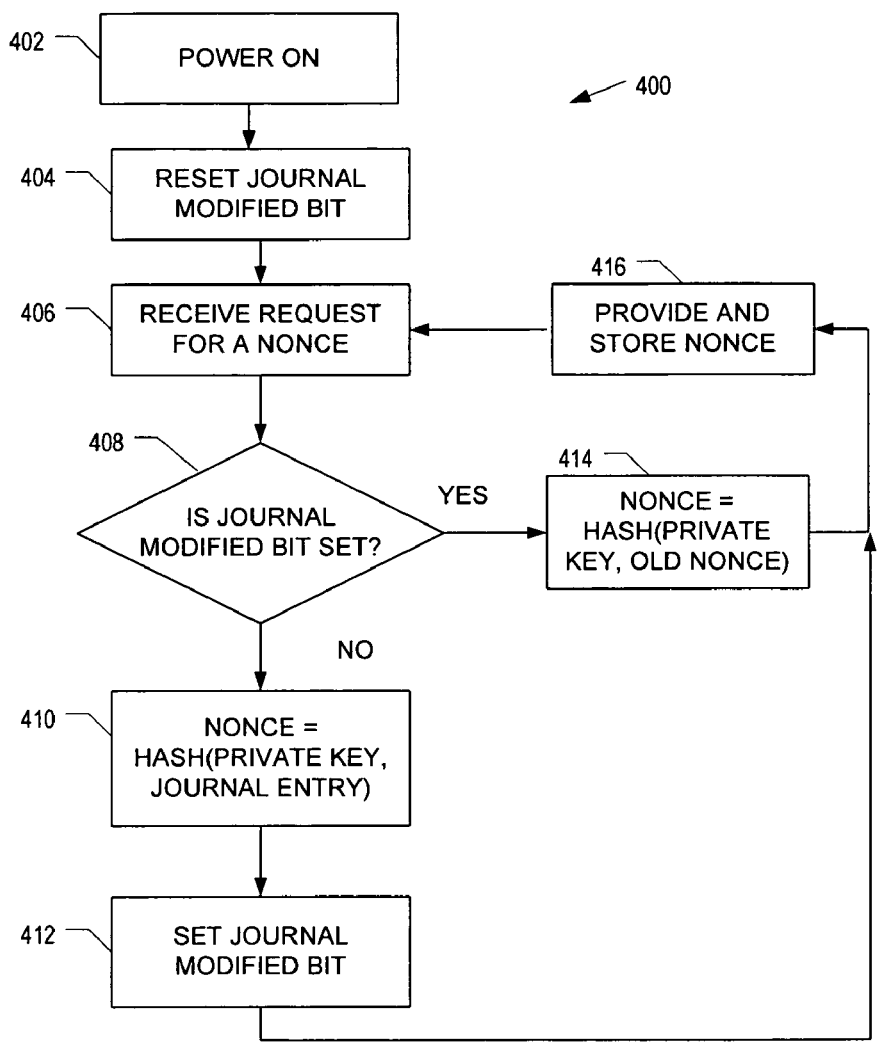
FIG. 4 illustrates a pseudo-random nonce generation flow diagram according to an embodiment of the present invention.

FIG. 4 illustrates pseudo-random nonce generation according to an embodiment of the present invention. The example process 400 of FIG. 4 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a ROM, a RAM, a magnetic media, an optical media, and/or any other suitable type of medium.

Further, although a particular order of actions is illustrated in FIG. 4, these actions may be performed in other temporal sequences. For example, the actions illustrated in FIG. 4 may be executed repetitive, serial, and/or parallel manners. Again, the example process 400 is merely provided and described in conjunction with the apparatus of FIGS. 1, 2, and/or 3 as an example of one way to provide pseudo-random nonce generations for a secure channel associated with a flash device.

In the example of FIG. 4, the process 400 may begin at system reset, block 402. A journal modified bit in other storage 199 is reset, block 404. A host requests a nonce using, for example, a Get Nonce command, block 406. The non-volatile device 140 determines if the journal modified bit is set or reset, block 408. If reset, a value is retrieved from the journal 198 and used with a private key to generate a nonce value, block 410. The journal bit is set, block 412. If the journal modified bit is determined to be set at block 408, the last used nonce and the private key are used to generate the nonce value, block 414. Generation of the nonce value in blocks 410 and 414 uses a Hash algorithm as described above. The generated nonce, whether from block 410 or 414, is stored in other storage 199 and returned to the host, block 416.

According to an embodiment of the present invention, the journal 198 is of sufficient size such that the number of unique patterns stored corresponds to the non-volatile device's expected lifetime power-cycles.

According to an embodiment of the present invention, updates to journal 198 are a one time programming event. Alternate embodiments may include resources to recycle the journal if necessary.

According to an embodiment of the present invention, nonce values may be used to prevent replay attacks on write transactions that include a signature. These write transactions may be sequences. According to some embodiments, it may not be necessary to have a nonce that is unrecognizable from previous value for each element in the sequence. Thus, the internal nonce may be incremented or otherwise systematically and predictably changed per transaction until a new nonce is requested.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method comprising:

each time a processor-based system boots, generating a different and unique first nonce value by retrieving one of a plurality of pre-stored nonce values, each of which is different and unique, stored in a memory to provide an unique initial pseudo-random value; and performing a hash function on the first nonce value and a cryptographic key to prevent unauthorized replay or reproduction of a communication.

2. The method as recited in claim 1, further comprising generating a second nonce value by performing the hash function on the first nonce value and the cryptographic key.

3. The method as recited in claim 1, wherein the memory contains a set of predetermined private values.

4. The method as recited in claim 3, wherein the set of predetermined private values is sufficiently large to provide a unique value upon power-up reset to last a device's lifetime.

5. The method as recited in claim 1, wherein the memory is a portion of a non-volatile memory array.

6. The method as recited in claim 1, wherein the first nonce value is a first generated nonce value after a power-on reset.

7. The method as recited in claim 1, wherein subsequent nonce values are generated by performing the hash function on a most recently generated nonce value and the cryptographic key.

8. The method as recited in claim 1, further comprising resetting a journal modified bit upon system power up.

9. The method as recited in claim 8, further comprising setting the journal modified bit after generating the first nonce value.

10. The method as recited in claim 1, wherein the first nonce value is generated in response to a command request.

11. An apparatus comprising:
a flash array;
a controller integrated with the flash array, the controller, upon each power up, to generate a unique and different first nonce value by retrieving one of a plurality of unique and different pre-stored nonce values stored in a memory to provide an unique initial pseudo-random value; and performing a hash function on the first nonce value and a cryptographic key to prevent unauthorized replay or reproduction of a communication.

12. The apparatus as recited in claim 11, the controller to further generate a second nonce value by performing the hash function on the first nonce value and the cryptographic key.

13. The apparatus as recited in claim 11, wherein the array contains a set of predetermined private values.

14. The apparatus as recited in claim 13, wherein the set of predetermined private values is sufficiently large to provide a unique value upon power-up reset to last a device's lifetime.

15. The apparatus as recited in claim 11, wherein the array is a portion of the flash array.

16. The apparatus as recited in claim 11, wherein the first nonce value is a first generated nonce value after a power-on reset of the apparatus.

17. The apparatus as recited in claim 11, the controller further to generate subsequent nonce values by performing the hash function on a most recently generated nonce value and the cryptographic key.

18. The apparatus as recited in claim 11, the controller further to reset a journal modified bit upon system power up.

19. The apparatus as recited in claim 18, the controller further to set the journal modified bit after generating the first nonce value.

20. The apparatus as recited in claim 11, wherein the first nonce value is generated in response to a command request.

* * * * *